Oct. 18, 1949.  E. B. HAMMOND, JR  2,484,823
SPRING SUSPENSION FOR GYROSCOPES
Filed Aug. 1, 1945
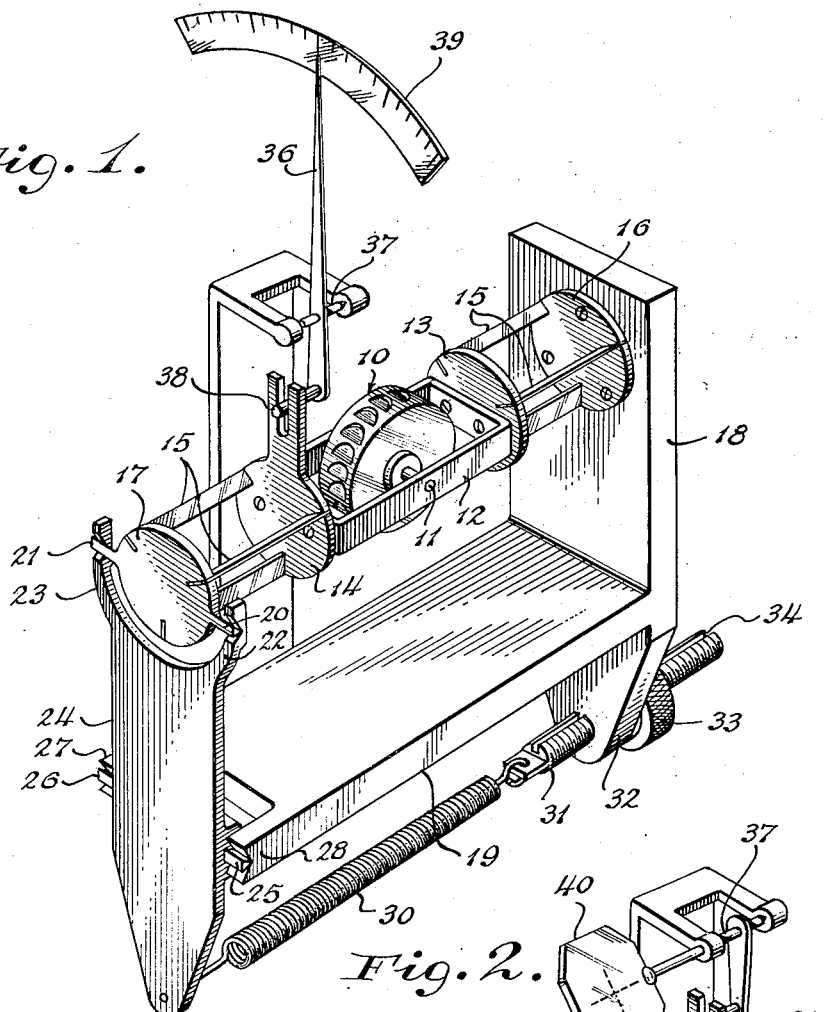
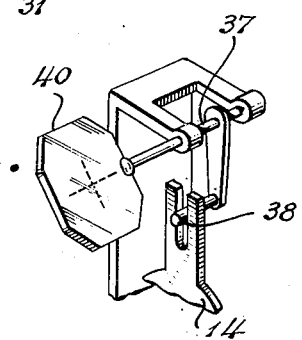
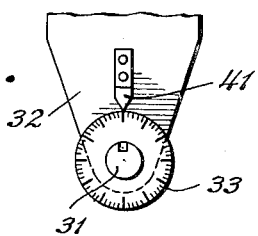
INVENTOR
E. B. HAMMOND, JR.
BY
Herbert H. Thompson
his ATTORNEY.

Patented Oct. 18, 1949

2,484,823

UNITED STATES PATENT OFFICE 2,484,823

SPRING SUSPENSION FOR GYROSCOPES

Edmund B. Hammond, Jr., Floral Park, N. Y., assignor to The Sperry Corporation, a corporation of Delaware Application August 1, 1945, Serial No. 608,118

14 Claims. (Cl. 74—5.4)

This invention relates to a suspension for a gyroscope and more particularly to a mounting for the precession or deflection axis of an angular rate measuring gyroscope of the two degrees of freedom type, which dispenses with the necessity for bearings about the precession axis with their attendant friction.

Gyroscopes of this type are now known in which the bearings about the precession or deflection axis have been entirely eliminated and replaced by a spring support which not only supports the gyroscope for limited precession about this axis, but also resiliently centralizes and shock-mounts the same. With such type gyroscopes, however, it is often desirable to adjust the sensitivity or the amount of precession that takes place for a given rate of turn. This is especially important where the gyroscope is used in fire control, where it is desirable to multiply angular rates by a variable, such as the time of flight of the shell. In the prior art spring-supported gyro of this type, it has been the practice to provide a separate adjustable spring or springs in addition to the spring support for such purpose. One feature of the present invention is to eliminate the necessity for such separate adjustable springs and to provide a means by which the sensitivity of the gyroscope may be varied directly by varying the torsional stiffness or resiliency of the spring support.

Another feature of the invention is the provision of a spring suspension for a gyroscope having torsional flexibility or resiliency and a high degree of rigidity in compression or stretching.

A further feature of the invention is to improve such spring supports whereby, while full resiliency is obtained to torsional stress, substantial rigidity is obtained against rotational movements about any other axis and all translatory movements.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects and features of the invention will appear in the following description given with the aid of the accompanying drawings, of which—

Fig. 1 shows schematically a gyroscope having a suspension according to a preferred embodiment of the invention;

Fig. 2 is a modification showing an arrangement by which a mirror or other line of sight defining device may be actuated by the gyroscope; and Fig. 3 is an end view of the device showing one form of a calibrated sensitivity adjusting arrangement.

Referring to Fig. 1 of the drawings, a gyroscope 10 shown as of the two degrees of freedom type has its spin axis 11 supported in a rotor bearing frame or ring 12. According to the present invention, the frame has a variable constraint support which includes discs 13 and 14 secured at opposite ends thereof, coaxially with the deflection axis. A plurality of flat or leaf springs 15 are secured at one end to each of the discs, the springs preferably being in alignment with equally spaced radii. The opposite ends of the springs are fastened similarly in rotationally fixed discs 16 and 17. Disc 16 is secured to a member 18 shown in the drawings as an upright support member attached to a base 19.

In order to provide a ready means for axially adjusting the tension on all springs, disc 17 is formed preferably with two arms 20 and 21 projecting from opposite edges along a diameter thereof, having knife edges thereon which rest in notches formed in spaced arms 22 and 23 on a supporting lever or upright 24. Said upright is likewise provided with oppositely disposed knife edge members 25 and 26 which rest in notches formed in the ends of spaced arms 27 and 28 projecting from base 19. The base 19 and spaced end support members 18 and 24 cooperate to form a scissors-like support between the members of which the gyroscope is supported by means of the connecting groups of springs 15.

A spring 30 is fastened between the lower end of the lever 24 and an adjusting screw 31, which slides in an opening in a support 32 as adjusting nut 33 is turned. The screw has a longitudinal slot 34 milled therein which rides on a suitable spline in the hole therefor, to prevent the screw from turning as the nut is adjusted.

Springs 15 are shown as being rectangular in cross section. The torsional stiffness of a metal bar which is very thin compared to its width is affected by changes in axial tension, being closely proportional to such axial tension. This subject is discussed in an article entitled "Increase of torsional stiffness of a prismatic bar due to axial tension," by M. A. Biot, Journal of Applied Physics for December 1939.

Applicant uses a plurality of flat springs arranged as described, to overcome the tendency of thin bars when used separately to buckle under compression of the side loads exerted by the weight of the rotor frame or caused by acceleration forces. The springs 15 are sufficiently stiff when tensioned by spring 30 at its weakest normal adjustment to support the gimbal ring and gyroscope without sag or bending. The torsional stiffness of both of the spring assemblies which controls the extent of precession of the gyroscope is varied according to the tension at which spring 30 is set. In other words, the tension imparted to the plurality of resilient supporting springs 15 may be simultaneously adjusted by varying the spacing between the supporting members 18 and 24 through the action of spring 30 and calibrated adjusting nut 33 which functions as a common means for adjusting the tension of both groups of springs 15. Preferably, spring 30 is so calibrated that nut 33 may be positioned with respect to a suitable index to set the gyroscope according to the sensitivity desired. Such an arrangement is shown in Fig. 3.

A gyroscope having a suspension according to the present invention, if used as a turn indicator, may operate an indicating device such as the pointer 36, supported on pivot 37 coupled to disc 14 by pin and slot connection 38. The pointer cooperates with a suitable scale 39.

The gyroscope may be used in any suitable manner in a fire control computer to furnish a measure of angular rate. By way of example, the pivot 37 is shown as projecting beyond its supporting bearings in Fig. 2, and attached to the pivot is a mirror 40 of the optical system of a line of sight defining system. The gyroscope here is used to deflect the mirror in accordance with a prediction component of a lead angle and thus is effective to offset the line of sight accordingly. A gyroscope having a support according to the present invention, when used in a computing gun sight has the advantage that the angular rate sensitivity may be varied, for example, in accordance with the time of flight of the projectile to produce a deflection proportional to the product of angular rate and time of flight. The nut 33 is shown in Fig. 3 as having a scale on its face which may be laid out according to time of flight, the scale being positioned with respect to stationary index 41 to adjust the sensitivity of the gyroscope in accordance with time of flight.

The gyroscope of the present invention may also be used for automatic pilots for aircraft. See, for instance, the copending application of Howard H. Haglund, Serial No. 602,834, for Angular rate gyroscopes, filed July 2, 1945. In such gyroscopes it is desirable occasionally to adjust the period of oscillation thereof with respect to the period of yaw of the craft, and the invention offers a simple means for making such adjustment.

An important feature of the present invention is that where many instruments which include rate gyroscopes are manufactured, the angular rate sensitivity of the gyroscopes may be adjusted readily to a standard.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A support for the gimbal frame of an angular rate gyroscope comprising a plurality of tensioned flat spring members attached to the gimbal frame in symmetrical spaced relation about and extending generally in the direction of the precession axis.

2. A support for the gimbal frame of an angular rate gyroscope comprising a plurality of flat spring members attached to the gimbal frame and disposed under tension lengthwise in symmetrical spaced relation about the precession axis.

3. A spring suspension for the gimbal frame of an angular rate gyroscope comprising a support disposed in alignment with the axis of precession, a plurality of torsion springs symmetrically arranged about the axis of precession, each being secured at one end to the gimbal frame, and at the other end to the support, spring means connected to the support effective in the direction of the precession axis for applying tension to the support and thereby tensioning the torsion springs.

4. A spring suspension for the gimbal frame of an angular rate gyroscope comprising a support disposed in alignment with the axis of precession, a plurality of torsion springs symmetrically arranged about the axis of precession, each being secured at one end to the gimbal frame, and at the other end to the support, means effective to apply tension in the direction of the axis of precession to the support thereby tensioning the torsion springs, and means for adjusting the tension effective to alter the sensitivity of the gyroscope.

5. In an angular rate gyroscope, spring means for rotationally supporting and yieldingly centralizing the gimbal frame thereof about its precession axis comprising a plurality of flat parallel torsion springs disposed respectively in equally spaced planes having the axis of precession as their common origin, one end of each spring being attached to the gimbal frame, a support for the gyroscope to which the other ends of the springs are attached, and means for maintaining the springs under tension.

6. In an angular rate gyroscope, spring means for rotationally supporting and yieldingly centralizing the gimbal frame thereof about its precession axis comprising a plurality of flat parallel torsion springs disposed respectively in equally spaced planes having the axis of precession as their common origin, one end of each spring being attached to the gimbal frame, a support for the gyroscope to which the other ends of the springs are attached, and common means for adjustably tensioning the springs for controlling the sensitivity of the gyroscope.

7. An angular rate gyroscope having a base, a gimbal frame, supports on the base disposed on opposite sides of the gimbal frame in alignment with the axis of precession thereof, means disposed on opposite sides of the gimbal frame for rotationally supporting and yieldingly centralizing the same comprising a plurality of flat springs disposed under tension about the axis of precession and parallel thereto in equally spaced planes having the axis of precession as their common origin, one end of each spring being fixed to the gimbal frame and the other to the adjacent support.

8. An angular rate gyroscope having a base, a gimbal frame, supports on the base disposed on opposite sides of the gimbal frame in alignment with the axis of precession thereof, means disposed on opposite sides of the gimbal frame for rotationally supporting and yieldingly centralizing the same comprising a plurality of flat springs disposed symmetrically about the axis of precession and parallel thereto one end of each spring being fixed to the gimbal frame and the other to the adjacent support, and means for maintaining the springs under such tension as to prevent buckling thereof due to the weight of the gimbal frame, whereby a rigid support for the gimbal frame along its axis of precession is provided which support at the same time has full resiliency to torsional stress.

9. An angular rate gyroscope having a base, a gimbal frame, supports on the base disposed on opposite sides of the gimbal frame in alignment with the axis of precession thereof, means disposed on opposite sides of the gimbal frame for rotationally supporting and yieldingly centralizing the same comprising a plurality of flat springs disposed symmetrically about the axis of precession and parallel thereto, one end of each spring being fixed to the gimbal frame and the other to the adjacent support, means for so tensioning the springs as to form thereby a support for the gimbal frame which has a high degree of rigidity in compression or stretching, with full resiliency to torsional stress.

10. An angular rate gyroscope having a base, a gimbal frame, a fixed and a movable support on the base disposed on opposite sides of the gimbal frame in alignment with the axis of precession thereof, spring means on opposite sides of the gimbal frame for rotationally supporting and yieldingly centralizing the same comprising a plurality of flat springs disposed about the axis of precession and parallel thereto in equally spaced planes having the axis of precession as their common origin, one end of each spring being fixed to the gimbal frame and the other to the adjacent support, and means for applying tension to the movable support to maintain the spring means on both sides of the gimbal frame taut.

11. An angular rate gyroscope having a base, a gimbal frame, a fixed and a movable support on the base disposed in alignment with the axis of precession thereof, spring means on opposite sides of the gimbal frame for rotationally supporting and yieldingly centralizing the same comprising a plurality of flat springs disposed about the axis of precession and parallel thereto in equally spaced planes having the axis of precession as their common origin, one end of each spring being fixed to the gimbal frame and the other to the adjacent support, a spring connected to the movable support for applying tension thereto to maintain the spring means on both sides of the gimbal frame taut, and means for adjusting the tension of the last mentioned spring to vary the response of the gyroscope.

12. An angular rate gyroscope having a base, a gimbal frame, a pair of relatively adjustable, spaced supports on said base adapted to accommodate said gyro therebetween, resilient means connecting opposite ends of said frame with said supports respectively for providing relatively high, substantially rigid resistance to all translational movements of said frame radially and along the precession axis of said gyroscope but relatively low, resilient resistance to rotational movements of said frame, and a common means for relatively adjusting the spacing of said supports whereby to simultaneously vary the tension on both of said resilient means to thereby vary the resistance to rotational movements of said frame.

13. An angular rate gyroscope having a base, a gimbal frame, a pair of spaced supporting members, resilient supporting means connecting said frame with said members, means for mounting said members on said base to provide relative movement thereof in a direction paralleling the precession axis of said frame, means for adjusting the spacing of said members whereby to vary the tension on said resilient supporting means, said resilient supporting means comprising a plurality of resilient elements so constructed and relatively arranged as to offer high substantially rigid resistance to bending under forces acting radially of said precession axis while offering relatively low resilient resistance to torsional forces exerted thereon by precession of said gyroscope, said latter resistance value being variable with variations in tension placed on said resilient supporting means by relative movement of said spaced supporting members.

14. An angular rate gyroscope having a base, a gimbal frame, a pair of spaced supporting members, resilient supporting means connecting said frame with said members, means for mounting said members on said base to provide relative movement thereof in a direction paralleling the precession axis of said frame, means for adjusting the spacing of said members whereby to vary the tension on said resilient supporting means, said resilient supporting means having a cross-sectional structure taken radially of said precession axis such as to offer relatively high resistance to bending under all forces acting thereon radially of said precession axis but offering relatively low resistance to precessional forces exerted thereon by said gyroscope, said latter resistance value being variable with variations in tension placed on said resilient supporting means by relative movement of said spaced supporting members.

EDMUND B. HAMMOND, JR.

REFERENCES CITED

The following references are of record in the file of this patent:

UNITED STATES PATENTS

| Number | Name | Date |
|---|---|---|
| 1,797,913 | Henderson | Mar. 24, 1931 |
| 2,291,612 | Draper | Aug. 4, 1942 |
| 2,322,108 | Best | June 15, 1943 |
| 2,345,169 | Wunsch et al. | Mar. 28, 1944 |
| 2,384,838 | Kellogg | Sept. 18, 1945 |

FOREIGN PATENTS

| Number | Country | Date |
|---|---|---|
| 200,833 | Great Britain | Oct. 4, 1923 |